Aug. 22, 1950  G. D. WILLITS  2,519,948
BEARING CONSTRUCTION
Filed April 16, 1949
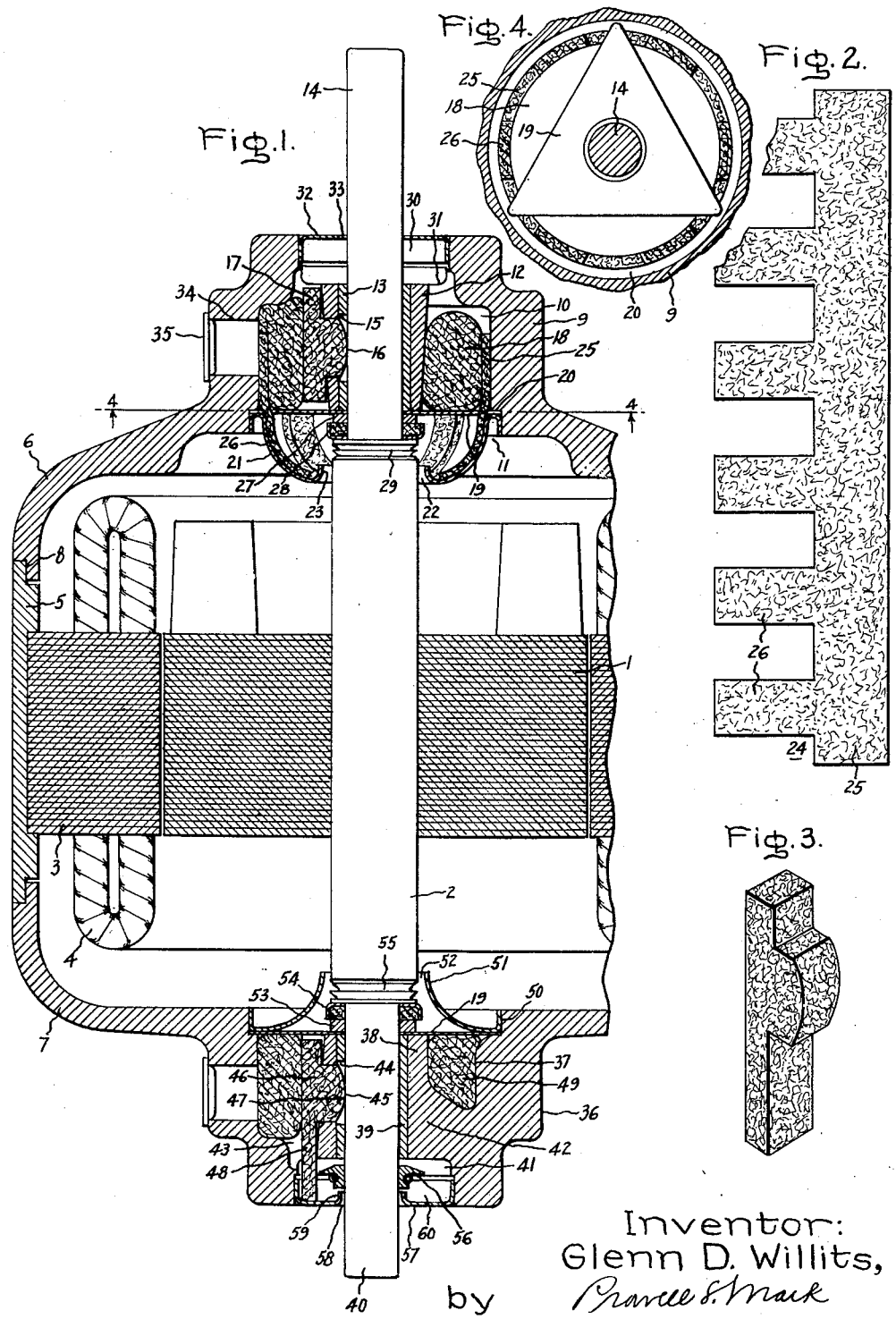
Inventor:
Glenn D. Willits,
by *[signature]*
His Attorney.

Patented Aug. 22, 1950

2,519,948

UNITED STATES PATENT OFFICE 2,519,948

BEARING CONSTRUCTION

Glenn D. Willits, Leo, Ind., assignor to General Electric Company, a corporation of New York Application April 16, 1949, Serial No. 87,874

1 Claim. (Cl. 308—134.1)

1

This invention relates to bearing constructions and more particularly to bearings for supporting a vertical shaft.

In the design of dynamoelectric machines intended for vertical operation, it is desirable to provide a bearing construction which enables the machine to be operated with the shaft extension extending either up or down without the necessity for making major changes in the arrangement of parts.

An object of this invention is to provide an improved bearing construction.

Another object of this invention is to provide an improved vertical bearing construction.

A further object of this invention is to provide an improved guide and thrust bearing combination for vertical shafts.

A still further object of this invention is to provide an improved guide and thrust bearing combination for vertical shafts wherein the shaft extension may extend either up or down.

Further objects and advantages of this invention will become apparent and the invention will be better understood from the following description referring to the accompanying drawings, and the features of novelty which characterize the invention will be pointed out with particularity in the claim annexed to and forming part of this specification.

In accordance with this invention, there is provided an upper guide bearing assembly including a housing member having a cavity formed therein with its opening facing down and a sleeve bearing positioned in the cavity. Lubricant absorbent material is positioned in the cavity surrounding the bearing for retaining lubricant and for feeding the same to the bearing. A concave cup member is positioned in the opening of the bearing housing cavity and is provided with an opening therein to receive the shaft with a re-entrant flange surrounding the shaft. A resilient retaining member is also positioned in the opening for retaining the absorbent material in the cavity. The retaining member engages the wall of the cavity at the minimum number of points leaving a plurality of spaces between the wall of the cavity and the retaining member. A sleeve of lubricant absorbent material is positioned in the cavity abutting the wall thereof and surrounding the lubricant retaining and feeding material and is provided with a plurality of projections which extend through the openings between the resilient retaining member and the cavity wall and lie in the concave cup member. These projections pick up lubricant which passes

2 through the bearing along the shaft and which is thrown therefrom by a lubricant thrower, returning this lubricant to the lubricant absorbent material. A lower thrust bearing assembly is provided having a bearing housing with an upper cavity formed therein having its opening facing up and a sleeve bearing positioned in said upper cavity. The lower bearing housing is also provided with a lower cavity separated from the upper cavity by a wall through which a lubricant returning opening is formed. In the event the machine is to be operated with the shaft extending up, the lower cavity of the lower bearing assembly is closed by a cap member, or in the event that the shaft extension is to be down, the lower cavity has a cap member positioned in the opening thereof having an opening formed therein to receive the shaft with a re-entrant flange surrounding the shaft. Lubricant absorbent material is positioned in the upper cavity for retaining lubricant and feeding the same to the bearing and a portion of this lubricant absorbent material extends through the opening in the wall separating the upper and lower cavities into the cap member closure of the lower cavity where it picks up lubricant which is passed through the bearing along the shaft and returns it to the upper cavity.

In the drawing, Fig. 1 is a side elevational view, partly in section, illustrating the improved vertical guide and thrust bearing combination of this invention; Fig. 2 is a detailed illustration of the absorbent sleeve member for the upper guide bearing of Fig. 1; Fig. 3 is a detailed illustration of the wick for the lower thrust bearing of Fig. 1; and Fig. 4 is a fragmentary cross-sectional view taken along the line 4—4 of Fig. 1.

Referring now to Fig. 1, there is shown a dynamoelectric machine of the vertical type having a rotor member 1 mounted on a shaft 2 and a stator member 3 provided with appropriate exciting windings 4. The stator member 3 is secured in a shell member 5 to which upper end shield 6 and lower end shield 7 are secured in any suitable manner, as by rabbet joints 8. The upper end shield 6 is provided with an upper bearing housing 9 having a cavity 10 formed therein with its opening 11 facing down. A bearing support 12 is formed in the cavity 10, also facing down, and a bearing sleeve 13 is secured therein and rotatably guides the upper shaft extension 14 of the shaft 2. An opening 15 is formed through the wall of the bearing support 12 and the bearing sleeve 13 communicating with the journal surface 16 of the upper shaft extension 14. A wick 17, formed of absorbent material, such as wool felt, is positioned in the bearing opening 15 for feeding lubricant to the journal surface 16. A ring of lubricant absorbent material 18. such as laced waste packing, is positioned in the cavity 10 surrounding the bearing support 12 and substantially filling the cavity. The ring 18 serves to retain lubricant and to feed the same to the wick 17. A triangular resilient retaining member 19 is positioned in a recessed portion 20 of the opening 11 for retaining the lubricant absorbent ring 18 in the cavity 10.

A cup member 21 is seated in the recessed portion 20 retaining the resilient retaining member 19 in position and is provided with an opening 22 for receiving the shaft 2 with a re-entrant flange portion 23 surrounding the shaft. A thin strip of lubricant absorbent material 24, as shown in Fig. 2, having a body portion 25 and a plurality of projections or fingers 26 is positioned in the cavity 10 so that the body portion 25 forms a cylindrical sleeve abutting the circumferential wall of the cavity 10 and surrounding the lubricant absorbent ring 18. The projections 26 extend out of the cavity 10 through the spaces between the resilient retaining member 19 and the circumferential wall of the cavity and lay in the concave cup member 21 extending substantially to the re-entrant flange portion 23. A thrust washer 27 is positioned on the shaft extension 14 adjacent the resilient retaining member 19 and a cushion washer-cup retainer lubricant thrower 28 is also positioned on the shaft extension 14 intermediate the thrust washer 27 and a plurality of lubricant throwing grooves 29 which are formed on the shaft 2. An upper cavity 30 is formed in the bearing housing 9 with lubricant returning openings 31 communicating with the main cavity 10. A cap member 32 is positioned in the opening of the upper cavity 30 and is provided with an opening 33 to receive the upper shaft extension 14. However, in the event that the machine is to have a shaft extension extending down, the upper shaft extension 14 may be cut off immediately above the bearing support and bearing sleeve assembly 12 and 13 and the opening 33 omitted so that the cap member 32 completely closes the opening of the upper cavity 30. Thus, the lubricant which passes upward through the bearing will enter the upper cavity 30 and be returned to the lubricant returning ring 18 through the openings 31. Lubricant which passes downwardly through the bearing will be thrown centrifugally between lubricant thrower 28 and the lubricant throwing grooves 29 into the concave cup member 21 where it is picked up by the fingers 26 of the lubricant absorbent sleeve 25 and thus returned to the lubricant retaining ring 18. An opening 34 in the bearing housing 9, which is closed by a cap member 35, is used to introduce lubricant into the cavity 10.

Referring now to the thrust bearing assembly, the lower end shield 7 is provided with a bearing housing 36 having an upper cavity 37 formed therein with its openings facing up. A bearing support 38 is in the upper cavity 37 extending upwardly and a bearing sleeve 39 is arranged therein for rotatably supporting the lower shaft extension 40. The bearing housing 36 is provided with a lower cavity 41 with its opening facing down separated from the upper cavity 37 by a wall 42. A lubricant return opening 43 is formed through the wall 42 communicating with the upper cavity 37 and lower cavity 41. The bearing support 38 and bearing sleeve 39 have a lubricant feeding opening 44 formed therethrough communicating with the journal surface 45 of the lower shaft extension 40. A wick member 46, formed of lubricant absorbent material such as wool felt, is provided having a projection 47 positioned in the opening 44 for feeding lubricant to the journal surface 45 and another projection or extension 48 which extends through the lubricant return opening 43 into the lower cavity 41. A ring of lubricant absorbent material 49, such as laced waste material, surrounds the bearing support 38 substantially filling the upper cavity 37 for retaining lubricant and for feeding the same to the wick 46. A resilient retaining member 19, as shown in Fig. 4, is positioned in a recess 50 in the opening of the upper cavity 37 and serves to retain the absorbent ring 49 in position. A convex cup member 51 is positioned in the recess 50 holding the resilient retaining member 19 in position and is provided with an opening 52 for receiving the shaft 2. A thrust washer 53 is positioned on the lower shaft extension 40 adjacent the resilient retaining member 19 and a cushion washer-cup retainer lubricant thrower 54 is secured to the shaft 40 intermediate the lubricating washer 53 and a plurality of lubricant throwing grooves 55 formed on the shaft 2. A lubricant thrower 56 is secured to the shaft extension 40 in the lower cavity 41 and a cap member 57 having an opening 58 with a re-entrant flange portion 59 positioned in the opening of the lower cavity 41. The extension 48 of the wick 46 extends into the reservoir portion 60 formed by the re-entrant flange 59 of the cap member 57. Thus, lubricant which passes up through the bearing will be thrown centrifugally by the lubricant thrower 54 and lubricant throwing groove 55 against the convex cup member 51 and is returned by gravity to the lubricant retaining ring 49 through the openings between the resilient retaining member 19 and the circumferential wall of the upper cavity 37. Lubricant which passes down through the bearing is thrown centrifugally by a lubricant thrower 56 against the circumferential wall of the lower cavity 41 where it falls into the reservoir 60 in the cap member 57 and is picked up by the projection 48 of the wick member 46. In the event that the machine is to be arranged with the shaft extension extending up, the lower shaft extension 40 can be cut off immediately below the bearing support and sleeve assembly 38 and 39 and the lubricant thrower 56, and the opening 58, and re-entrant flange portion 59 of the cap member 57 may be omitted.

It will now be readily seen that this construction provides an improved upper guide and lower thrust bearing combination for vertical shafts and it will also be readily understood that either the upper bearing assembly or the lower bearing assembly can be utilized independently.

While I have illustrated and described a particular embodiment of this invention, modifications thereof will occur to those skilled in the art. I desire it to be understood, therefore, that this invention is not to be limited to the particular arrangement disclosed, and I intend in the appended claim to cover all modifications which do not depart from the spirit and scope of this invention.

What I claim as new and desire to secure by Letters Patent of the United States is:

A vertical bearing construction comprising a bearing housing member having a cavity formed therein with its opening facing down, a sleeve bearing positioned in said cavity for guiding a rotatably vertical shaft and having a lubricant feeding opening therethrough for communicating with the journal surface of said shaft, a wick of lubricant absorbent material positioned in said bearing opening for feeding lubricant to said journal surface, a ring of lubricant absorbent material surrounding said bearing and substantially filling said cavity for retaining said lubricant and feeding the same to said wick, a resilient member positioned in said cavity opening for retaining said lubricant absorbent ring in position, said resilient member being arranged to provide a plurality of spaces between the circumferential wall of said cavity and said circumferential member, a concave cup member closing said cavity opening and having an opening formed therein for receiving said shaft with a re-entrant flange portion surrounding said shaft, and a cylindrical sleeve of lubricant absorbent material positioned in said cavity abutting the circumferential walls thereof, said sleeve surrounding a portion of said lubricant absorbent ring and having a plurality of fingers projecting therefrom, said fingers extending through said spaces between said resilient member and said circumferential wall of said cavity and lying in said cup member for returning lubricant flung from said shaft to the said lubricant absorbent ring.

GLENN D. WILLITS.

REFERENCES CITED

The following references are of record in the file of this patent:

UNITED STATES PATENTS

| Number | Name | Date |
| --- | --- | --- |
| 2,124,479 | Whitaker | July 19, 1938 |
| 2,135308 | Killam | Nov. 1, 1938 |
| 2,284,446 | Power | May 26, 1942 |

FOREIGN PATENTS

| Number | Country | Date |
| --- | --- | --- |
| 505,498 | Great Britain | May 10, 1939 |